United States Patent [19]

Motomura et al.

[11] 4,311,364

[45] Jan. 19, 1982

[54] CAMERA FILTERS AND A METHOD OF MAKING THE SAME

[75] Inventors: Reiji Motomura, Tama; Hirofumi Ohta, Hachioji; Takashi Matsuura, Oume; Kou Itaya, Tokorozawa, all of Japan

[73] Assignee: Hoya Corporation, Tokyo, Japan

[21] Appl. No.: 145,178

[22] Filed: Apr. 29, 1980

[30] Foreign Application Priority Data

Aug. 29, 1979 [JP] Japan .................. 54/109180

[51] Int. Cl.³ .............. G02B 7/00; B29C 27/08; B29C 27/10
[52] U.S. Cl. ........................ 350/318; 350/257; 156/73.1
[58] Field of Search ........... 350/318, 257, 252, 311, 350/313–317, 67, 58; 156/73.1, 73.5, 580.1, 580.2, 99

[56] References Cited

U.S. PATENT DOCUMENTS 3,843,433  10/1974  Golden et al. ................ 156/73.1

FOREIGN PATENT DOCUMENTS 1441539  5/1966  France ..................... 350/67
566698  1/1945  United Kingdom ........... 350/252

Primary Examiner—Jon W. Henry
Attorney, Agent, or Firm—Sughrue, Mion, Zinn, Macpeak and Seas

[57] ABSTRACT

A filter for a camera comprises a filter plate, and a split frame formed from a thermoplastic synthetic resin and holding the filter plate therein. The frame is composed of an internally threaded front portion and an externally threaded rear portion adapted for attachment to the lens holding tube of the camera. The front and rear portions are integrally secured to each other by thermal fusion, with an adhesive, by threaded connection, and combinations thereof. Also disclosed is a method of making such a filter. The thermal fusion of the frame portions is advantageously effected by application of ultrasonic waves.

10 Claims, 7 Drawing Figures

CAMERA FILTERS AND A METHOD OF MAKING THE SAME

BACKGROUND OF THE INVENTION

1. Field of the Invention

This invention relates to a filter for a camera, and more particularly, to a camera filter having an annular frame made of a synthetic resin and a filter plate held therein. This invention is also concerned with a method of making such a filter.

2. Description of the Prior Art

Camera filters are known having a frame made of a metal such as aluminum and brass. For instance, the filter shown in partial cross-section in FIG. 1 has an annular frame 1 provided with an axially projecting reduced diameter portion defining a flange 2 which attaches the filter to the lens holding tube of a camera. A filter plate 3 has its periphery held against the inner periphery of the flange 2, and a retaining ring 4 is screwed into the frame 1 to retain the filter plate 3 against the flange 2. Alternatively, the frame 1 is provided along its inner periphery with a dual diameter annular recess 5 including a larger diameter portion formed along the inner periphery of the flange 2, as is shown in FIG. 2. The filter plate 3 is held in the smaller diameter portion of the annular recess 5 between stub(s) or smaller diameter ring section 5a and retaining ring 6 of elastic material having a circular or other cross section is disposed in the larger diameter portion of the recess 5 to retain the filter plate 3 in position. Since the frames are made of a metal, however, these filters are heavy in weight, and are also expensive because the elements of the frame require machining. These filters are difficult to assemble automatically, and require a large amount of human labor for their fabrication. This necessarily adds to the cost of their manufacture.

In order to eliminate these disadvantages of filters having metallic frames, it has recently been proposed to make such frames of a synthetic resin. A filter having a frame made of a synthetic resin is light in weight, and less expensive, since the frame can be press-formed. A typical commercially available filter having a frame 1 formed from a synthetic resin is shown in FIG. 3. The flange 2 of the frame 1 is formed with an annular ridge 7 along its inner periphery. When the filter is assembled, the annular ridge 7 is elastically deformed to enable forcible insertion of a filter plate 3 into the frame. The filter shown in FIG. 3 is, however, unsatisfactory, since the filter plate fails to be tightly held within the frame, and also because the forcible insertion of the filter plate is likely to cause damage to the ridge 7, thereby impairing the appearance of the filter.

As shown in FIG. 4, it is also known to use a filter having a radially inwardly projecting annular flange 8 along the inner periphery of its frame 1, and a filter plate 3 held against the flange 8 and secured thereto and to the inner periphery of the frame 1 with an adhesive 9. The filter shown in FIG. 4 is unsatisfactory, too. In the event the filter plate is made of glass, the difference in the coefficient of expansion between the filter plate and the frame, which is made of a synthetic resin, is likely to cause detachment of the filter plate from the frame. Exposure of any excess adhesive from the area between the filter plate and the frame is often very detrimental to the overall appearance of the filter.

In any of the filters known in the art, the frame is made of a single element.

SUMMARY OF THE INVENTION

This invention eliminates the aforementioned drawbacks of the filters for cameras known in the art.

It is an object of this invention to provide a filter for a camera having a frame made of a synthetic resin, and having a construction which permits automatic fabrication without requiring any cumbersome manual work.

It is another object of this invention to provide a filter for a camera presenting an improved appearance without exposing at all the area in which a filter plate is secured to a frame with an adhesive.

It is still another object of this invention to provide a method of manufacturing a filter for a camera having a frame made of a synthetic resin by adapting the frame to any reasonable variation in the thickness of a filter plate.

It is a further object of this invention to provide a light-weight filter for a camera having a synthetic resin frame and a filter plate which are firmly secured to each other.

These objects can be attained by this invention which provides a novel and improved filter for a camera having a frame made of a synthetic resin and composed of an internally threaded front portion and an externally threaded rear portion adapted for attachment to a lens holding tube on a camera, the front and rear frame portions being integrally connected with each other by threaded connection or adhesion, and a filter plate held between the front and rear frame portions and secured thereto by ultrasonic adhesion or otherwise, and which also provides a method of making such a filter. According to a further aspect of this invention, at least one of the front and rear portions of the frame is provided with a saw-toothed or otherwise rugged end configuration in the region where the two portions are secured to each other. This rugged configuration is advantageous for providing a fine appearance to the filter and adapting the frame to different thicknesses of the filter plate as will later be described in detail. The use of ultrasonic waves is advantageous for achieving an improved strength of adhesion between the various elements of the filter, as well as facilitating automatic fabrication thereof.

DETAILED DESCRIPTION OF THE INVENTION

Figure 1:
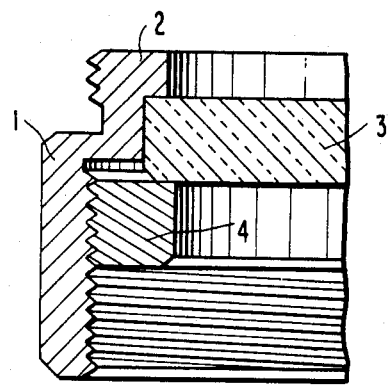
FIG. 1 is a partial longitudinal sectional view of a known filter for a camera having a metallic frame.
Figure 2:
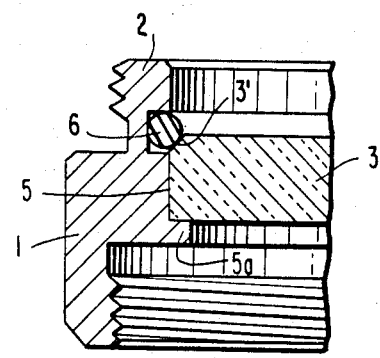
FIG. 2 is a view similar to FIG. 1, showing a modification to the filter shown therein.
Figure 3:
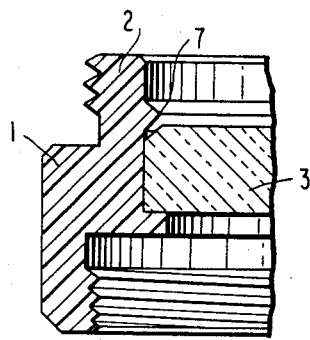
FIG. 3 is a partial longitudinal sectional view of a known filter for a camera having a frame made of a synthetic resin.
Figure 4:
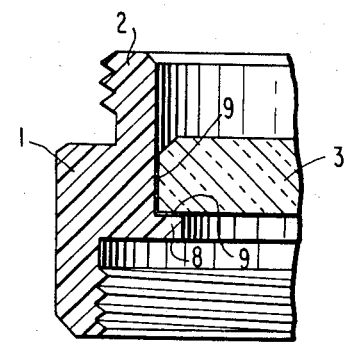
FIG. 4 is a view similar to FIG. 3, illustrating a modification to the filter shown therein.
Figure 5:
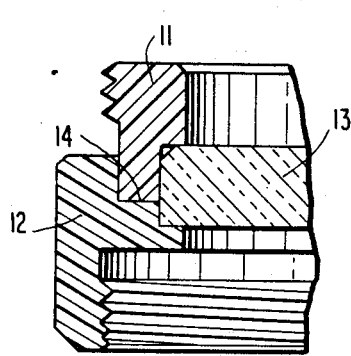
FIG. 5 is a partial longitudinal sectional view of a filter for a camera according to the present invention having a frame made of a synthetic resin.

Referring to FIG. 5 of the drawings, a camera filter embodying this invention is shown, which comprises a filter plate 13 and a frame holding the filter plate 13 therein. According to a salient feature of this invention, the frame, which is formed from a thermoplastic synthetic resin such as acrylonitrile-butadiene-styrene copolymer and polycarbonate, comprises an externally threaded rear portion 11 adapted for attachment to the lens holding tube of a camera and an internally threaded front portion 12. The filter plate 13 is held between the front and rear frame portions 12 and 11 which are secured to each other in an area 14. Both the front and rear portions, 12 and 11, respectively, are simple in shape and can be easily prepared by press-forming. The area 14 in which the two portions 11 and 12 are secured to each other is concealed within the frame and not visible from outside thereof. This feature assists in the preparation of a filter having a fine appearance. The connection of the two portions 11 and 12 can be accomplished by using an ordinary adhesive (for instance, where acrylonitrile-butadiene (ABS) is used as the annular frame, methyl ethyl ketone (MEK) is preferably used as an adhesive), but more advantageously, it can be effected by application of ultrasonic waves (using, for example, a frequency of about 10 KHz) at an appropriate intensity to fuse the resin material in the area 14 to join the two portions integrally. The use of ultrasonic waves is advantageous, as it provides a strong attachment between the two frame portions 11 and 12 and facilitates automatic fabrication of the filter.

Figure 6:
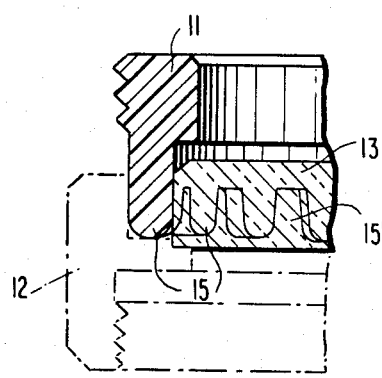
FIG. 6 is a view similar to FIG. 5, illustrating a modification to the filter shown in FIG. 5.

FIG. 6 shows a modified form of the filter shown in FIG. 5, likewise having a frame made of a thermoplastic synthetic resin and composed of a rear portion 11 and a front portion 12 which are integrally connected with each other. According to a salient feature of the structure shown in FIG. 6, the rear portion 11 of the frame is provided with a saw-toothed edge configuration at the connecting end thereof where the rear portion 11 is connected to the front portion 12. The saw-toothed configuration comprises a plurality of projections 15 and a plurality of recesses 15' which are arranged in alternate relation to the projections 15, as shown in FIG. 6. This rugged edge configuration provides a number of advantages in the manufacture of the filter according to this invention. If too much ultrasonic wave energy is applied for the fusion of the resin material to join the two frame portions, there is a likelihood that too much resin material may become molten and swell out of the area of attachment between the two frame portions, thereby impairing the overall appearance of the filter. According to the structure of this invention, however, it is possible to prevent exposure of such excess molten resin material to the exterior of the filter, as all such excess material can be neatly confined within the recesses 15'. The rugged configuration is also advantageous in that it is possible to adapt the two frame portions to any reasonable variation in the thickness of the filter plate 13 without the necessity of using frame portions having different dimensions. If the filter plate 13 has a relatively large thickness, the resin material of the projections 15 is melted to a relatively small extent; if the filter plate 13 has a relatively small thickness, the projections 15 are melted to a larger extent, and any excess of the resulting molten resin material is confined within the recesses 15', without leaking out to the exterior of the filter. Typically, the filter plate has a thickness of about 1.7 to 2.5 mm.

Figure 7:
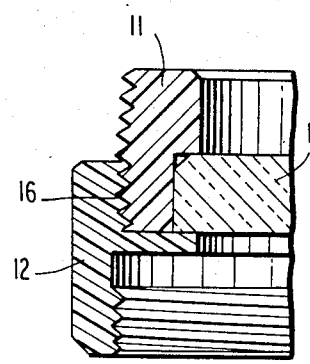
FIG. 7 is a partial longitudinal sectional view of a camera filter according to another embodiment of this invention.

Another modified form of the filter according to this invention is shown in FIG. 7, and has a frame composed of a rear portion 11 which is externally threaded along its entire length, and a front portion 12 which is internally threaded at both ends thereof. The rear and front portions 11 and 12 are connected in a threaded relationship with each other at 16, and are further joined with an adhesive or by fusion as hereinbefore described. This combined mode of connection provides a very strong attachment between the two frame portions. While such a strong attachment may not be necessary for a filter for ordinary use, it is quite useful for a filter intended for use under special conditions.

While the invention has been described with reference to preferred embodiments thereof, it is to be understood that further modifications or variations may be easily made by anybody of ordinary skill in the art without departing from the spirit and scope of this invention as defined by the appended claims.

What is claimed is:

1. A filter for a camera comprising:
   a filter plate; and
   a frame plate made of a synthetic resin and holding said filter plate therein, said frame being composed of an internally threaded front portion, and an externally threaded rear portion adapted for attachment to a lens holding tube of the camera, said front and rear portions being separate elements and being integrally connected to each other so as to hold said filter plate therebetween.

2. A filter as set forth in claim 1, wherein said front portion is provided at a connecting end with an annular recess in which a connecting end of said rear portion is fitted, the opposite end of said front portion being internally threaded and the opposite end of said rear portion being externally threaded, said front and rear portions being internally recessed to receive said filter plate around the periphery thereof.

3. A filter as set forth in claim 2, wherein said front and rear portions are joined to each other with an adhesive.

4. A filter as set forth in claim 2, wherein said front and rear portions are thermally fused with each other by ultrasonic sound.

5. A filter as set forth in claim 4, wherein said connecting end of said rear portion is provided with a plurality of projections defining in turn a plurality of recesses in alternate relation thereto, said projections being fused to said connecting end of said front portion.

6. A filter as set forth in claim 1, wherein said front portion is internally threaded at both ends thereof, and said rear portion is externally threaded along its entire length, and is connected in threaded relationship with said connecting end of said front portion.

7. A filter as set forth in claim 6, wherein said front and rear portions are further joined to each other with an adhesive.

8. A method of making a filter for a camera, comprising:
   preparing from a thermoplastic synthetic resin an internally threaded front frame portion and an externally threaded rear frame portion for attachment to the lens holding tube of the camera;
   disposing a filter plate between said front and rear frame portions;

inserting said rear frame portion into said front frame portion; and applying ultrasonic waves to at least a part of the area of contact between said front and rear frame portions to cause fusion of the resin material therein to connect said portions integrally with each other to form a frame holding said filter plate therein.

9. A method as set forth in claim 8, further including forming at least one of said front and rear frame portions with a plurality of projections spaced around one end thereof prior to said applying of ultrasonic waves, wherein said ultrasonic waves are applied to said projections.

10. A method as set forth in claim 8, further including connecting said rear frame portion into said front frame portion in a threaded relationship prior to said applying of ultrasonic waves.

* * * * *